United States Patent [19]
Proctor et al.

[11] Patent Number: 5,562,408
[45] Date of Patent: Oct. 8, 1996

[54] ISOLATED TURBINE SHROUD

[75] Inventors: Robert Proctor, West Chester; David R. Linger, Cincinnati; David A. Di Salle, West Chester; Steven R. Brassfield, Cincinnati; Larry W. Plemmons, Fairfield, all of Ohio

[73] Assignee: General Electric Company, Cincinnati, Ohio

[21] Appl. No.: 470,095

[22] Filed: Jun. 6, 1995

[51] Int. Cl.⁶ .................................................. F01D 11/18
[52] U.S. Cl. ......................... 415/173.1; 415/177; 415/178
[58] Field of Search ...................... 415/177, 178, 415/173.1, 173.4

[56]     References Cited

U.S. PATENT DOCUMENTS

| | | | |
|---|---|---|---|
| 4,101,242 | 7/1978 | Coplin et al. | 415/134 |
| 4,303,371 | 12/1981 | Eckert | 415/116 |
| 4,543,039 | 9/1985 | Ruis et al. | 415/173.1 |
| 4,573,866 | 3/1986 | Sandy, Jr. et al. | 415/116 |
| 5,165,848 | 11/1992 | Plemmons | 415/177 |
| 5,169,287 | 12/1992 | Proctor et al. | 415/115 |
| 5,174,714 | 12/1992 | Plemmons et al. | 415/177 |
| 5,176,495 | 1/1993 | Honkomp et al. | 415/173.1 |
| 5,195,868 | 3/1993 | Plemmons et al. | 415/178 |
| 5,238,365 | 8/1993 | Petsche | 415/178 |

OTHER PUBLICATIONS

General Electric Company, CF34–3A1 gas turbine engine in production more than 1 year; 3 figures showing high pressure turbine shrouds and unpublished proposed temporary fix.

*Primary Examiner*—Edward K. Look
*Assistant Examiner*—James A. Larson
*Attorney, Agent, or Firm*—Andrew C. Hess; Wayne O. Traynham

[57]      ABSTRACT

A turbine shroud includes an annular shroud support joined to an annular outer casing and spaced radially inwardly therefrom to define an annular flow duct for receiving compressor bleed air. A plurality of shroud panels are joined to the shroud support and have a radially inner surface positionable radially above turbine rotor blades to define a tip clearance therebetween. An isolation shield is joined to the shroud support radially above the panels and includes a plurality of open-ended cells facing radially outwardly in the duct toward the outer casing for inducing drag in the bleed air flowable axially through the duct to thermally isolate the shroud support from the bleed air for controlling the tip clearance.

10 Claims, 2 Drawing Sheets

ISOLATED TURBINE SHROUD

The present invention relates generally to gas turbine engines, and, more specifically, to clearance control between turbine rotor blade tips and a stator shroud spaced radially thereabove.

BACKGROUND OF THE INVENTION

A gas turbine engine includes in serial flow communication one or more compressors followed in turn by a combustor and high and low pressure turbines disposed axisymmetrically about a longitudinal axial centerline within an annular outer casing. During operation, the compressors are driven by the turbine and compress air which is mixed with the fuel and ignited in the combustor for generating hot combustion gases. The combustion gases flow downstream through the high and low pressure turbines which extract energy therefrom for driving the compressors and producing output power either as shaft power or thrust for powering an aircraft in flight, for example.

Each of the turbines includes one or more stages of rotor blades extending radially outwardly from respective rotor disks, with the blade tips being disposed closely adjacent to a turbine shroud supported from the casing. The tip clearance defined between the shroud and blade tips should be made as small as possible since the combustion gases flowing therethrough bypass the turbine blades and therefore provide no useful work. In practice, however, the tip clearance is typically sized larger than desirable since the rotor blades and turbine shroud expand and contract at different rates during the various operating modes of the engine.

The turbine shroud has substantially less mass than that of the rotor blades and disk and therefore responds at a greater rate of expansion and contraction due to temperature differences experienced during operation. Since the turbines are bathed in hot combustion gases during operation, they are typically cooled using compressor bleed air suitably channeled thereto. In an aircraft gas turbine engine for example, acceleration burst of the engine during takeoff provides compressor bleed air which is actually hotter than the metal temperature of the turbine shroud. Accordingly, the turbine shroud grows radially outwardly at a faster rate than that of the turbine blades which increases the tip clearance and in turn decreases engine efficiency. During a deceleration chop of the engine, the opposite occurs with the turbine shroud receiving compressor bleed air which is cooler than its metal temperature causing the turbine shroud to contract relatively quickly as compared to the turbine blades, which reduces the tip clearance.

Accordingly, the tip clearance is typically sized to ensure a minimum tip clearance during deceleration, for example, for preventing or reducing the likelihood of undesirable rubbing of the blade tips against the turbine shrouds.

The turbine shroud therefore directly affects overall efficiency or performance of the gas turbine engine due to the size of the tip clearance. The turbine shroud additionally affects performance of the engine since any compressor bleed air used for cooling the turbine shroud is therefore not used during the combustion process or the work expansion process by the turbine blades and is unavailable for producing useful work. Accordingly, it is desirable to reduce the amount of bleed air used in cooling the turbine shroud for maximizing the overall efficiency of the engine.

In order to better control turbine blade tip clearances, active clearance control systems are known in the art and are relatively complex for varying during operation the amount of compressor bleed air channeled to the turbine shroud. In this way the bleed air may be provided as required for minimizing the tip clearances, and the amount of bleed air may therefore be reduced. However, in order to minimize the complexity and cost of providing clearance control, typical turbine shrouds are unregulated in cooling the various components thereof.

SUMMARY OF THE INVENTION

A turbine shroud includes an annular shroud support joined to an annular outer casing and spaced radially inwardly therefrom to define an annular flow duct for receiving compressor bleed air. A plurality of shroud panels are joined to the shroud support and have a radially inner surface positionable radially above turbine rotor blades to define a tip clearance therebetween. An isolation shield is joined to the shroud support radially above the panels and includes a plurality of open-ended cells facing radially outwardly in the duct toward the outer casing for inducing drag in the bleed air flowable axially through the duct to thermally isolate the shroud support from the bleed air for controlling the tip clearance.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
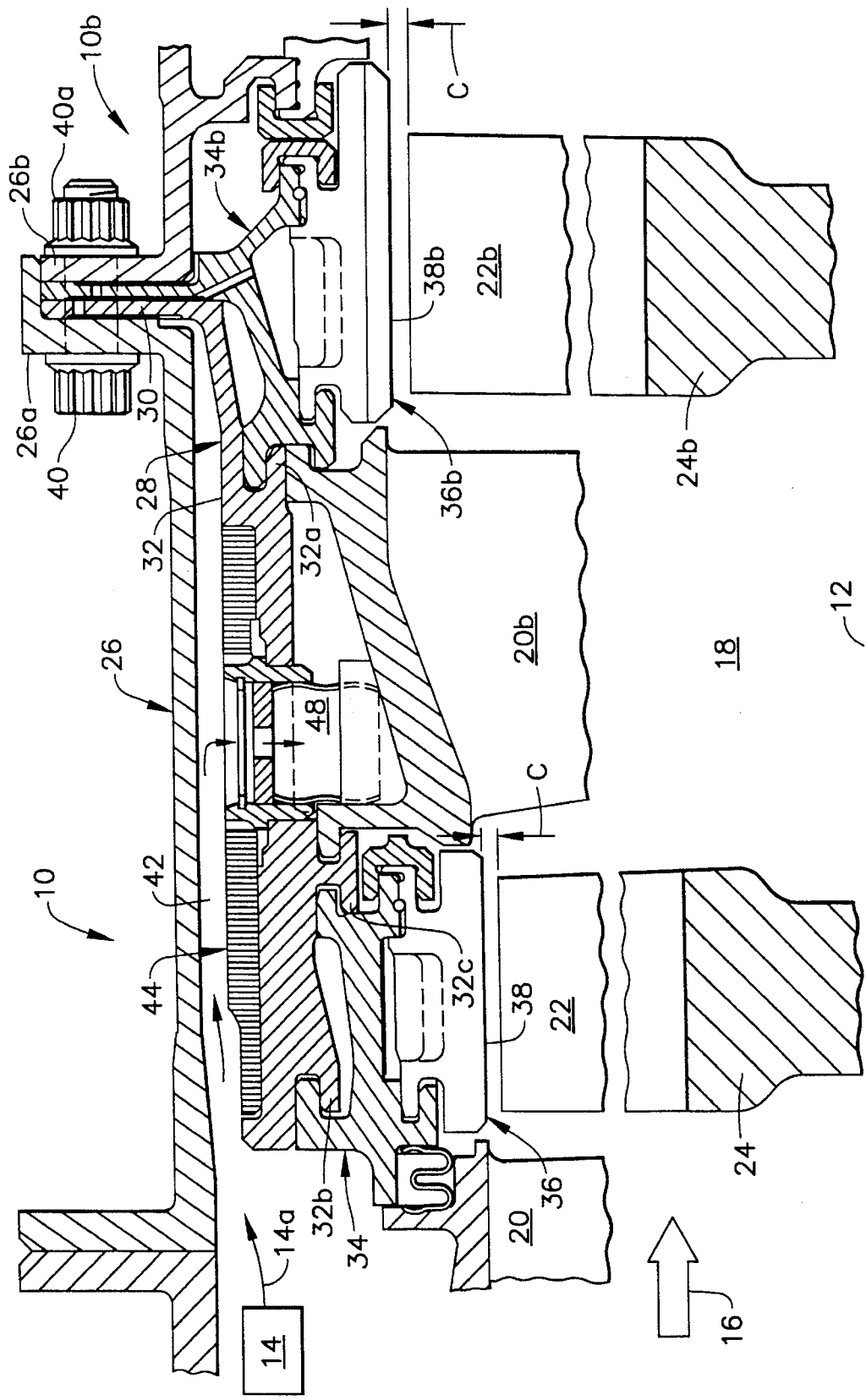
FIG. 1 is a partly sectional axial view through a portion of an axisymmetrical turbine shroud in accordance with one embodiment of the present invention surrounding two stages of turbine rotor blades extending outwardly from respective rotor disks.

Illustrated in FIG. 1 is an exemplary embodiment of a turbine shroud 10 which is axisymmetrical about an axial centerline axis 12 in an aircraft gas turbine engine. The aircraft engine also includes one or more conventional compressors one of which is represented schematically by the box 14, with compressed air being channeled to a conventional combustor (not shown) in which the air is mixed with fuel and ignited for generating hot combustion gases 16 which are discharged axially therefrom.

Disposed downstream from the combustor is a conventional high pressure turbine (HPT) 18 which receives the combustion gases 16 for extracting energy therefrom. In this exemplary embodiment, the HPT 18 includes at least two stages, with the first stage including the turbine shroud 10 and the second stage including a second stage turbine shroud 10b. The first and second stages include conventional first and second stage stationary turbine nozzles 20,20b each having a plurality of circumferentially spaced apart stator vanes extending radially between outer and inner annular bands. Disposed downstream from the nozzles 20,20b are respective pluralities of circumferentially spaced apart first and second stage turbine rotor blades 22,22b extending radially outwardly from first and second stage rotor disks 24,24b axisymmetrically around the centerline axis 12.

The first stage turbine shroud 10 illustrated in FIG. 1 is an assembly including a corresponding portion of an annular outer stator casing 26 which provides a stationary support for the several components thereof. The outer casing 26 is axially split at a pair of adjacent first and second radial flanges 26a and 26b which complement each other and are formed as respective integral ends of the casing 26 at the splitline. An annular, one-piece shroud ring or support 28 is suspended from the casing first and second flanges 26a,b and is used in both the first and second stage shrouds 10,10b, as well as supports the second stage nozzle 20b. The shroud support 28 is generally L-shaped in transverse section and has an annular radial support flange 30 and an integral annular forward support leg 32 which extends axially forwardly from a radially inner end of the support flange 30. The forward support leg 32 extends axially forwardly for supporting respective components of both the first and second stage turbine shrouds and the nozzle 20b.

An annular, multi-segmented first stage shroud hanger 34 is suspended from the forward, free distal end of the support 28. An annular one-piece second stage shroud ring or hanger 34b is also suspended from the aft end of the support 28 at the casing first and second flanges 26a,b and is disposed with the shroud support 28 coaxially about the centerline axis 12. The second stage shroud hanger 34b is generally Y-shaped in transverse section and has an annular radial hanger flange, and integral annular forward and aft hanger legs at a radially inner end thereof. The forward and aft legs extend axially oppositely to each other, with the forward leg having a forward hook being conventionally supported on a corresponding aft hook 32a of the forward support leg 32. The first stage shroud hanger 34 is generally H-shaped in transverse section with top forward and aft hooks being conventionally supported on a corresponding pair of forward hooks 32b and 32c at the distal forward end of the support leg 32.

A plurality of arcuate first stage shroud panels 36 are conventionally removably fixedly joined to the forward hanger hooks 32b,c by corresponding hooks. And, a plurality of arcuate second stage shroud panels 36b are conventionally removably fixedly joined to the second stage shroud hanger 34b. Any suitable mounting arrangement of the respective shroud panels 36, 36b may be used for joining them to the respective shroud hangers 34, 34b and in turn to the shroud support 28 and outer casing 26.

Each of the shroud panels 36,36b has an outer surface which faces radially outwardly towards the bottom surface of the respective shroud hanger 34,34b. Each panel 36,36b also includes a radially inner surface 38,38b which is positionable radially above tips of the respective first and second stage rotor blades 22,22b to define respective tip clearances C therebetween.

The support flange 30 and the second stage hanger radial flange are axially positioned or sandwiched between the first and second casing flanges 26a,b in abutting or sealing contact with each other, with all four flanges having a plurality of circumferentially spaced apart, axially extending common or aligned bolt holes, with each bolt hole receiving a respective bolt 40 (and complementary nut 40a) for axially clamping together the four flanges to support the first and second stage shrouds 10,10b and the second stage nozzle 20b from the casing 26.

As shown in FIG. 1, the forward leg 32 of the common shroud support 28 extends generally axially and parallel to the casing 26 and is spaced radially inwardly therefrom to define an annular flow channel or duct 42 for axially receiving compressor bleed air 14a from the compressor 14.

The bleed air 14a is suitably channeled to both first and second stage shrouds 10, 10b and the second stage nozzle 20b for providing cooling thereof against the heating caused by the hot combustion gases 16 during operation. Since all of these components are cantilevered or suspended from the outer casing 26 at the common casing flanges 26a,b they thermally expand and contract at relatively faster rates than that of the relatively slower responding, higher mass rotor blades 22, 22b and their respective rotor disks 24, 24b. Accordingly, the respective tip clearances c vary in size during operation.

For example, during an acceleration burst typically occurring in take-off operation of the gas turbine engine being used for powering an aircraft in flight, the bleed air 14a is actually hotter than the stator metal temperature of the shrouds 10, 10b. As a result, the stator components react and grow outwardly away from the rotor blades 22, 22b relatively quickly and at a faster rate than that of the slower expanding blades 22, 22b and disks 24, 24b, which increases the tip clearances C. During a deceleration chop, the opposite occurs, with the stator components receiving cooler bleed air than the metal temperature thereof, with corresponding thermal contraction at a greater rate than that of the respective blades 22, 22b and disks 24, 24b. This reduces the size of the tip clearances C and may lead to undesirable tip rubbing unless the tip clearances C are initially made relatively large, or the respective shrouds 10, 10b are designed for better matching the thermal expansion and contraction of the rotor blades 22, 22b.

In accordance with the present invention as illustrated in FIG. 1, a thermal isolation shield 44 is suitably fixedly joined to the shroud support 28 at least in part radially above the first stage shroud panels 36 for reducing the thermal response time of the first stage shroud 10 for in turn reducing the variation in the blade tip clearance C for improving performance. The isolation shield 44 as illustrated in more particularity in FIGS. 2 and 3 and includes a plurality of radially extending open-ended cells 46 facing radially outwardly in the flow duct 42 toward the outer casing 26 for inducing drag and boundary layer turbulence in the bleed air 14a flowable axially through the duct 42 to thermally isolate at least the distal end portion of the shroud support 28 from the thermal affect of the bleed air 14a for controlling the tip clearance C above the first stage blades 22.

Figure 2:
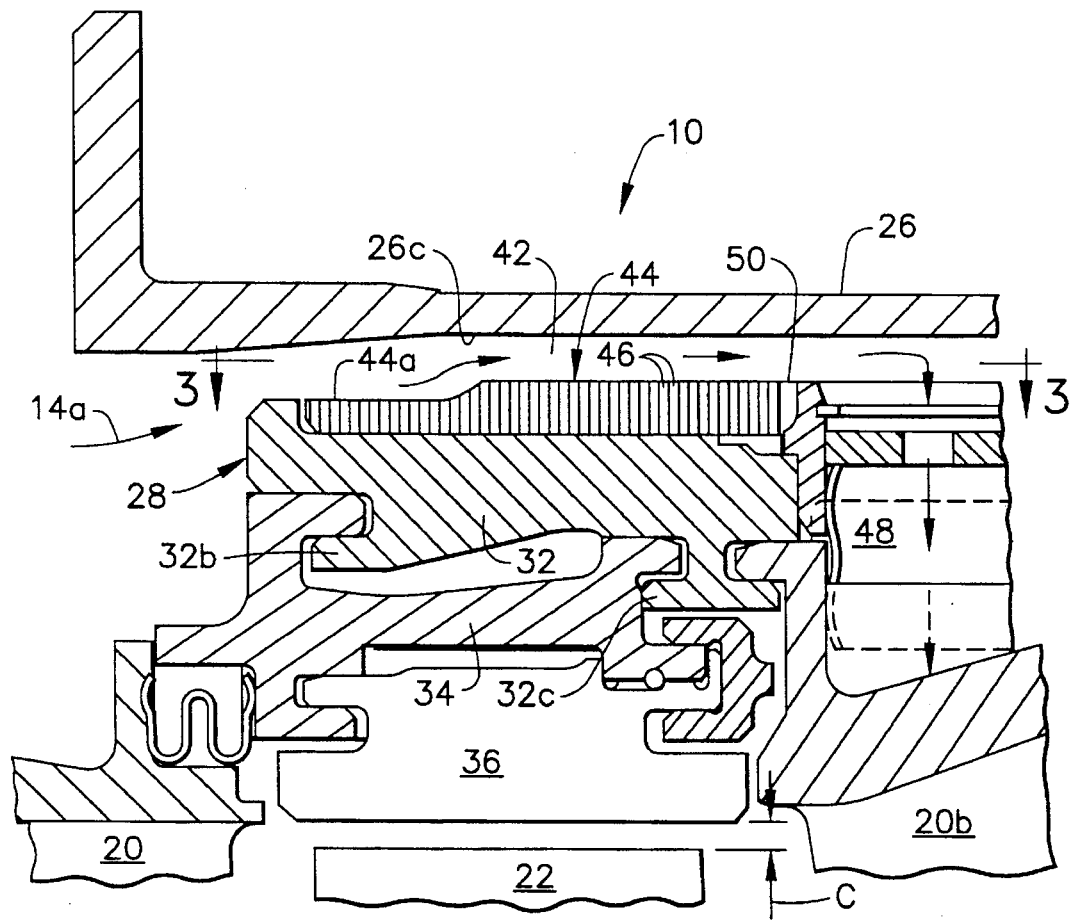
FIG. 2 is an enlarged view of the turbine shroud illustrated in FIG. 1 showing in more detail the support of shroud panels disposed over first stage turbine blades.

As shown in FIG. 2, the outer casing 26 preferably includes an aerodynamically smooth or turbulence free inner surface 26c facing radially inwardly toward the shield 44. The shield 44 is disposed preferably generally parallel to the casing inner surface 26c and is spaced radially inwardly therefrom so that the flow duct 42 is effective for channeling the bleed air 14a axially aft or downstream through the duct 42. The shield 44 thereby is effective for biasing or diverting the bleed air 14a to flow radially outwardly therefrom and radially toward the casing inner surface 26c. The shield cells 46 preferably extend radially perpendicularly to the shroud support 28, and are preferably fully empty, although in alternate embodiments they could be partially filled with a suitable insulating material.

Since the cells 46 are open-ended and face radially outwardly, they provide a substantial disruptive flow surface for the bleed air 14a being channeled axially thereacross. A fluid such as the bleed air 14*a* will follow the path of least resistance, and therefore the drag induced by the outer surface of the shield 44 will divert the bleed air 14*a* to flow more closely adjacent to the casing inner surface 26*c* which is aerodynamically smooth in comparison to the shield 44 and correspondingly has less drag. Accordingly, the heat transfer between the bleed air 14*a* and the forward support leg 32 of the shroud support 28 is correspondingly reduced which reduces the thermal response time of the forward support leg 32 and decreases the variation in the tip clearance C.

In addition to diverting the bleed air 14*a* radially outwardly toward the outer casing 26, the shield 44 also effects a relatively large buffer or wake region over the outer surface of the shield 44 which has reduced heat transfer capability, which further reduces the heat transfer into the forward support leg 32.

Figure 3:
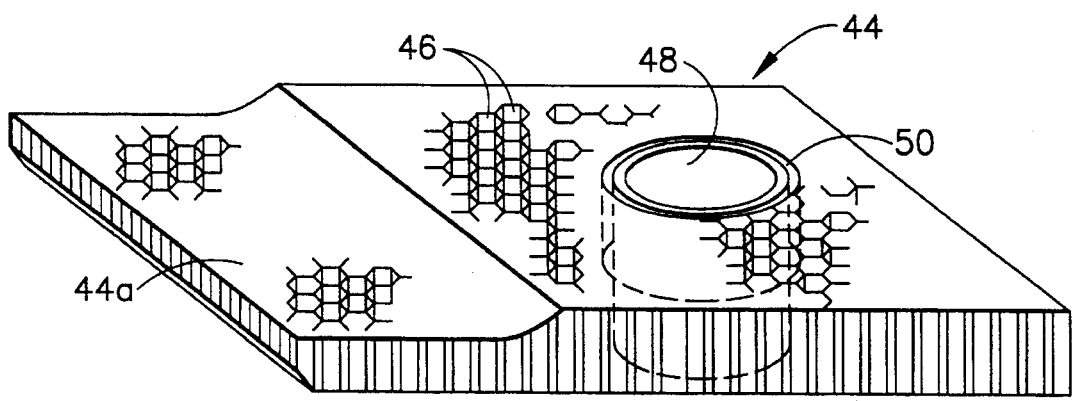
FIG. 3 is a perspective view of a portion of the isolation shield illustrated in FIG. 2 and taken generally along line 3—3.

In the preferred embodiment of the invention as illustrated in FIGS. 2 and 3, the shield cells 46 are defined by relatively thin gauge sheet walls for further reducing heat transfer from the bleed air 14*a* to the forward leg 32 of the shroud support 28. The thickness of the cell walls is substantially less than the width of the individual cells 46, at least one order of magnitude for example. Accordingly, the thin cell walls provide minimal material for heat conduction radially inwardly to the forward support leg 32. And, the preferably empty cells 46 provide relatively stagnant voids which reduces convection heat transfer radially inwardly. In the exemplary embodiment of the invention illustrated, the shield 44 may be made of a suitable metal such as Hastalloy-X, although other suitable metals or insulating non-metal materials may be used. The open cell structure of the shield 44 therefore results in a relatively lightweight and inexpensive shield which can significantly reduce the otherwise quick thermal response time of the first stage turbine shroud 10. Accordingly, the tip clearance is better controlled and may be maintained relatively small for maximizing efficiency of operation of the engine.

As shown in FIG. 1, the shield 44 extends axially aft or downstream from the free distal end of the forward support leg 32, and continues axially downstream over most of the second stage turbine nozzle 20*b* to adjacent the second stage shroud hanger 34*b* along the outer surface of the forward support leg 32. The shield 44 may extend axially over the forward support leg 32 as desired for controlling the thermal response thereof due to the bleed air 14*a* being channeled downstream through the flow duct 42. In the exemplary embodiment illustrated in FIG. 1, the shield 44 is axially coextensive with the first stage shroud hanger 34 and the shroud panels 36 supported therefrom, and additionally extends axially coextensively with a major portion of the second stage turbine nozzle 20*b*. In this way, thermal response of both the first stage shroud 10 and the second stage turbine nozzle 20*b* may be controlled for reducing thermal mismatch relative to the various rotor components.

As shown in FIG. 1 and 2, the second stage turbine nozzle 20*b* includes at least one and preferably several radially extending inlet ports 48 disposed in flow communication with the flow duct 42 for receiving a portion of the bleed air 14*a* therefrom for conventionally internally cooling the turbine nozzle 20*b*. Correspondingly, the shield 44 as illustrated in FIG. 2 and 3 includes a respective access hole 50 therein for receiving the respective nozzle inlet port 48.

Accordingly, the shield 44 may extend axially as desired, and the shield 44 may be a fully annular structure disposed about the centerline axis 12 (see FIG. 1) and may be configured as a full 360° continuous ring or as discrete arcuate segmented portions. In the exemplary embodiment illustrated in the Figures, the shield 44 comprises an opened-celled honeycomb with hexagonal cells 46 conventionally brazed at their radially inner ends to the outer surface of the forward support leg 32. As shown in FIG. 2, the forward support leg 32 may have a suitable recess in which the shield 44 may be positioned and brazed. Since the forward distal end of the forward support leg 32 is spaced radially inwardly from the inner surface 26*c* of the outer casing 26 as shown in FIG. 2, it provides an inlet in the form of an annulus to the flow duct 42. Since the forward support leg 32 may transiently thermally expand during operation, the shield 44 preferably includes a stepped leading edge 44*a* for increasing the radial depth of the flow duct 42 at the shield leading edge for reducing closing of the flow duct 42 thereat due to transient thermal expansion of the forward support leg 32 relative to the outer casing 26. The shield leading edge 44*a* has a finite axial length which is parallel to the remaining downstream portion of the shield, with an arcuate ramp therebetween. This ramp configuration assists in diverting the bleed air 14*a* radially outwardly away from the shield 44 and toward the casing inner surface 26*c*.

According, the isolation shield 44 not only provides an effective thermal insulator around the forward support leg 32 of the shroud support 28, but also effects a flow diverter for directing bleed air 14*a* radially outwardly away from the shield 44 itself. Thermal insulation is therefore effected by the shield 44 by its thin and open celled structure which reduces conduction and convection heat transfer; diverts the bleed air 14*a* literally away from the shield 44; and by the buffer region or layer over the outer surface of the shield 44 which itself decreases heat transfer therethrough. The collective effects of the isolation shield 44 decrease the thermal response of the first stage shroud hanger 34 and the shroud panels 36 supported therefrom, to in turn reduce the variations of the tip clearance C for improving operating efficiency of the high pressure turbine 18.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A turbine shroud positionable radially above a plurality of turbine rotor blades for controlling tip clearance therebetween comprising:

an annular outer casing;

an annular shroud support fixedly joined to said casing and spaced radially inwardly therefrom to define an annular flow duct for receiving compressor bleed air;

a plurality of shroud panels joined to said shroud support and having a radially inner surface positionable radially above said rotor blades to define said tip clearance therebetween; and an isolation shield fixedly joined to said shroud support radially above said shroud panels, and including a plurality of open-ended cells facing radially outwardly in said duct toward said outer casing for inducing drag in said bleed air flowable axially through said duct to thermally isolate said shroud support from said bleed air for controlling said tip clearance.

2. A turbine shroud according to claim 1 wherein:

said outer casing includes an aerodynamically smooth inner surface facing said shield; and said shield is disposed generally parallel to said casing inner surface and is spaced radially inwardly therefrom so that said duct is effective for channeling said bleed air axially through said duct, with said shield thereby diverting said bleed air to flow radially outwardly therefrom and radially toward said casing inner surface.

3. A turbine shroud according to claim 2 wherein said shield cells are defined by sheet walls for reducing heat transfer from said bleed air to said shroud support.

4. A turbine shroud according to claim 3 wherein said shield cells extend radially perpendicularly to said shroud support.

5. A turbine shroud according to claim 3 wherein said shield cells are empty.

6. A turbine shroud according to claim 3 further comprising:

a shroud hanger fixedly joined to said shroud support and extending radially inwardly therefrom; and said shroud panels are joined to said shroud hanger.

7. A turbine shroud according to claim 6 wherein:

said outer casing is axially split at a pair of adjacent first and second radial flanges;

said shroud support includes a radial flange fixedly joined to said casing first and second flanges, and an integral, axially extending support leg at a radially inner end of said radial flange which is spaced radially inwardly from said casing to define said flow duct; and said shroud hanger and panels are supported by a distal end of said shroud support leg.

8. A turbine shroud according to claim 7 wherein said shroud hanger is a first stage hanger, and further comprising:

a second stage shroud hanger fixedly joined to said shroud support and said casing first and second flanges with a plurality of second stage shroud panels being supported from said second stage shroud hanger;

a second stage turbine nozzle having a radially extending inlet port disposed in flow communication with said flow duct for receiving a portion of said bleed air therefrom for cooling said turbine nozzle; and said isolation shield extends axially from said first stage shroud hanger and axially over said second stage turbine nozzle to adjacent said second stage shroud hanger, and includes an access hole for receiving said nozzle inlet port.

9. A turbine shroud according to claim 8 wherein said isolation shield further includes a stepped leading edge for increasing radial depth of said flow duct at said shield leading edge for reducing closing of said flow duct thereat due to transient thermal expansion of said shroud support relative to said casing.

10. A turbine shroud according to claim 9 wherein said isolation shield comprises an opened-celled honeycomb brazed to said shroud support.

* * * * *